United States Patent
Stahl, Sr. et al.

(10) Patent No.: US 7,427,050 B2
(45) Date of Patent: Sep. 23, 2008

(54) APPARATUS FOR ADJUSTABLY RETAINING AND SEALING PATHWAY CONDUITS MOUNTED EXTENDING THROUGH A WALL PANEL

(75) Inventors: James P. Stahl, Sr., Stockton, NJ (US); James P. Stahl, Jr., Flemington, NJ (US); Julio Lopes, Scotch Plains, NJ (US); Leonid Kreyman, Manalapan, NJ (US)

(73) Assignee: Specified Technologies Inc., Somerville, NJ (US)

( * ) Notice: Subject to any disclaimer, the term of this patent is extended or adjusted under 35 U.S.C. 154(b) by 279 days.

(21) Appl. No.: 11/328,605

(22) Filed: Jan. 10, 2006

(65) Prior Publication Data

US 2007/0175125 A1    Aug. 2, 2007

(51) Int. Cl.
    *F16L 5/00*    (2006.01)
(52) U.S. Cl. .................. 248/56; 174/98; 174/99 R; 52/220.7; 52/220.8; 52/232
(58) Field of Classification Search ............ 52/220.8, 52/232, 220.7, 660; 174/98, 99 R, 70 C, 174/21 R, 24, 69.1, 47, 135, 19, 34, 95; 439/207; 248/205.1, 68.1, 56, 904
See application file for complete search history.

(56) References Cited

U.S. PATENT DOCUMENTS

| | | | | |
|---|---|---|---|---|
| 3,022,030 A | * | 2/1962 | Geer ........................ | 248/58 |
| 3,110,131 A | | 11/1963 | Jeffress | |
| 3,857,136 A | * | 12/1974 | Dean ...................... | 174/152 R |
| 4,262,166 A | | 4/1981 | Radzishevsky et al. | |
| 4,282,695 A | * | 8/1981 | Lew ......................... | 52/668 |
| 4,452,025 A | * | 6/1984 | Lew ......................... | 52/668 |
| 4,702,444 A | * | 10/1987 | Beele ....................... | 248/56 |
| 4,771,136 A | * | 9/1988 | Graver et al. ............... | 174/362 |
| 4,835,343 A | | 5/1989 | Graef et al. | |
| 5,417,019 A | | 5/1995 | Marshall et al. | |
| 5,493,068 A | * | 2/1996 | Klein et al. ................. | 174/362 |
| 5,509,560 A | | 4/1996 | Nash | |
| 5,560,174 A | | 10/1996 | Goto | |
| 5,783,776 A | | 7/1998 | Birmingham et al. | |
| 5,825,962 A | * | 10/1998 | Walters et al. ............. | 385/135 |
| 5,910,267 A | * | 6/1999 | Stricker ..................... | 219/548 |
| 5,939,676 A | * | 8/1999 | Birmingham et al. ....... | 174/656 |
| 5,942,724 A | | 8/1999 | Russo et al. | |
| 6,165,066 A | * | 12/2000 | Sharp et al. ................ | 454/273 |
| 6,192,640 B1 | * | 2/2001 | Snyder ..................... | 52/302.1 |
| 6,229,087 B1 | | 5/2001 | Archer | |
| 6,329,599 B1 | | 12/2001 | Zimmerman | |
| 6,508,445 B1 | | 1/2003 | Rohmer | |
| 6,520,345 B1 | | 2/2003 | Marovic et al. | |
| 6,536,169 B2 | | 3/2003 | Dykhoff | |

(Continued)

*Primary Examiner*—Brian Glessner
*Assistant Examiner*—James J Buckle, Jr.
(74) *Attorney, Agent, or Firm*—Sperry, Zoda & Kane (57) ABSTRACT

A multi-part mounting assembly for securing a plurality of individual pathway conduits relative to one another extending through a wall panel between adjacently positioned wall studs including two support members extending parallel to one another and defining therebetween a pathway conduit zone for receiving the individual conduits along with end members for providing sealing at the outermost edges and one or more partitioning means securable at a plurality of discrete positions within slots defined in the support members and being securable with respect to the support members and including set screws for safely holding pathway conduits in position extending therethrough.

19 Claims, 3 Drawing Sheets

U.S. PATENT DOCUMENTS

| | | | |
|---|---|---|---|
| 6,576,835 B1 * | 6/2003 | Ford et al. | 174/50 |
| 6,601,356 B2 * | 8/2003 | Snyder | 52/302.1 |
| 6,928,777 B2 | 8/2005 | Cordts | |
| 7,288,730 B2 * | 10/2007 | Habel et al. | 174/650 |
| 2001/0002657 A1 * | 6/2001 | Mendoza | 211/26 |
| 2001/0015280 A1 | 8/2001 | Karst et al. | |
| 2001/0022231 A1 | 9/2001 | Dyer | |
| 2001/0032429 A1 * | 10/2001 | Snyder | 52/302.1 |
| 2002/0178664 A1 | 12/2002 | Dykhoff | |
| 2003/0172603 A1 * | 9/2003 | McKesson | 52/232 |
| 2004/0128927 A1 | 7/2004 | Cole | |
| 2004/0226235 A1 | 11/2004 | Stempinski | |
| 2005/0202732 A1 | 9/2005 | Rizzo et al. | |

* cited by examiner

APPARATUS FOR ADJUSTABLY RETAINING AND SEALING PATHWAY CONDUITS MOUNTED EXTENDING THROUGH A WALL PANEL

BACKGROUND OF THE INVENTION

1. Field Of The Invention

The present invention deals with the concept of sleeved apertures which extending through walls for allowing communication between rooms in residential and commercial buildings for various purposes such as for telecommunication lines, computer lines, and/or physical flow lines such as flow lines for gas or liquid materials. Lines for transferring digital information such as computer data lines are in very high usage demand due to common placement of multiple computer stations within various rooms. Modular sleeves are designed to reduce the amount of space required to penetrate the wall barrier as well as to improve the integrity of the wall itself. Since the demand has become so great for such communication lines in position extending through walls and buildings, it is necessary to provide a means for ganging or assembling multiple units extending through a wall panel. The present invention provides a means for providing a fixture which accommodates a given number of wall penetrating pathway conduits while at the same time providing universally adjustable partitions which allows for a secure installation when less than the maximum fixture capacity is utilized extending through a particular wall fixture.

2. Description Of The Prior Art

Numerous patents have been granted on articles in this field such as shown in U.S. Pat. No. 3,110,131 patented Nov. 12, 1963 to T. N. Jeffress on "Building Construction"; and U.S. Pat. No. 4,262,166 patented Apr. 14, 1981 to Oleg L. Radzishevsky et al on a "Sealed Inlet For Bunched Conductors"; and U.S. Pat. No. 4,835,343 patented May 30, 1989 to John T. Graef et al and assigned to Lutron Electronics Co., Inc. on a "Two Piece Face Plate For Wall Box Mounted Device"; and U.S. Pat. No. 5,417,019 patented May 23, 1995 to David P. Marshall et al and assigned to Lamson & Sessions Co. on a "Passthrough Device With Firestop"; and U.S. Pat. No. 5,509,560 patented Apr. 23, 1996 to William L. Nash on a "Gangable Plastic Box For Electrical Outlets"; and U.S. Pat. No. 5,560,174 patented Oct. 1, 1996 to Yasuo Goto and assigned to Home Co., Ltd. on a "Connector"; and U.S. Pat. No. 5,783,776 patented Jul. 21, 1998 to John A. Birmingham et al and assigned to O-Z Gedney Company LLC on an "Electrical Cable Penetration Seal With Compliant Module"; and U.S. Pat. No. 5,942,724 patented Aug. 24, 1999 to Thomas R. Russo et al and assigned to The Wiremold Company on a "Wire Containment System For Mounting On A Wall Structure"; and U.S. Pat. No. 6,229,087 patented May 8, 2001 to John Charles Archer and assigned to Thomas & Betts International, Inc. on a "Gangable Electrical Box"; and U.S. Pat. No. 6,329,599 patented Dec. 11, 2001 to Harry I. Zimmerman on a "Flanged Conduit And Insulation For Electric Wires And Method Of Use"; and U.S. Pat. No. 6,508,445 patented Jan. 21, 2003 to Richard Rohmer and assigned to Pass & Seymour, Inc. on a "Gangable Low Voltage Bracket For Electrical Devices"; and U.S. Pat. No. 6,520,345 patented Feb. 18, 2003 to Maijana Marovic et al and assigned to Hubbell Incorporated on a "Self-Squaring Relay Rack Assembly"; and U.S. Pat. No. 6,536,169 patented Mar. 25, 2003 to Michael G. Dykhoff and assigned to 3M Innovative Properties Company on an "Adjustable Rack For Supporting Firestop Material In A Through-Penetration"; and U.S. Pat. No. 6,928,777 patented Aug. 16, 2005 to Brandon L. Cordts and assigned to 3M Innovative Properties Company on a "Method and Apparatus For Firestopping A Through-Penetration"; and United States Patent Application Publication No. 2001/0015280 published Aug. 23, 2001 to Ronald E. Karst et al and assigned to Pent Assemblies, Inc. on a "Wall Panel Assembly"; and United States Patent Application Publication No. 2001/0022231 published Sep. 20, 2001 to Edward P. Dyer and assigned to Hellermann Tyton Corporation on a "Modular Duct"; and United States Patent Application Publication No. 2002/0178664 published Dec. 5, 2002 to Michael G. Dykhoff and assigned to 3M Innovative Properties Company on an "Adjustable Rack For Supporting Firestop Material In A Through-Penetration"; and United States Patent Application Publication No. 2004/0128927 published Jul. 8, 2004 to Michael T. Cole and assigned to The Wiremold Company on an "Integrated Ceiling And Wireway Distribution System"; and United States Patent Application Publication No. 2004/0226235 published Nov. 18, 2004 to Shawn Stempinski and assigned to The Wiremold Company on "Modular Floor Panels With Enclosed Wireway Channels"; and United States Patent Application Publication No. 2005/0202732 published Sep. 15, 2005 to David J. Rizzo et al and assigned to ILSCO Corporation on a "Lay-In Electrical Connector".

SUMMARY OF THE INVENTION

The present invention provides an apparatus for adjustably retaining and sealing pathway conduits mounted in positions extending through wall panels in commercial or residential buildings. The apparatus includes a first support member securable to a wall adjacent to at least one pathway conduit extending therethrough which is generally L-shaped in cross-section. The first support member is adapted to abut and sealingly engage a pathway conduit positioned immediately thereadjacent. The first support member also defines a plurality of first mounting slots therein and is constructed such as to include a first mounting panel positioned adjacent the wall panel for mounting thereto and a first partition attachment panel being detachably securable with respect to the wall panel. The first mounting panel extends across the wall panel in an orientation generally parallel thereto. The first partition attachment panel extends approximately perpendicular with respect to the first mounting panel and outwardly therefrom. The first mounting slots are defined in the first partition attachment panel and extend generally perpendicularly with respect to the first mounting panel.

A second support member is also included which is preferably generally L-shaped in cross-section and can be secured to a wall spatially disposed from the first support member to define therebetween a pathway conduit zone for receiving, retaining and sealing adjacent pathway conduits extending therethrough. This second support member is adapted to abut and sealingly engage a pathway conduit positioned threadjacent within the pathway conduit zone. The second support member defines a plurality of second mounting slots within each of these mounting slots is aligned with one of the first mounting slots to define therewith a plurality of transverse mounting locations therealong. The second support member includes a second mounting panel positioned adjacent the wall panel for mounting thereto and a second partition attachment panel being detachably securable with respect thereto. The second mounting panel extends across the wall panel and is generally parallel thereto. The second partition attachment panel preferably extends approximately perpendicularly with respect to the second mounting panel and outwardly therefrom. The second mounting slot is defined in the second partition attachment panel. The second mounting slot also preferably extends perpendicularly with respect to the second mounting panel.

A first end member is also included extending between the first support member and the second support member which is adapted to abut and sealingly engage a pathway conduit positioned thereadjacent while also maintaining the proper spacing between the first and second support member. Similarly a second end member extends between the first support member and the second support member at a position spatially disposed from the first end member to define the pathway conduit zone therebetween. This second end member is adapted to abut and sealingly engage a pathway conduit positioned thereadjacent within the pathway conduit zone.

A partitioning member which preferably extends vertically is detachably securable with respect to the first mounting slots of the first support member and with respect to the second mounting slots of the second support member at at least one of the discrete transverse mounting positions defined therealong in such a manner as to extend therebetween. This partitioning member preferably includes a sealing surface facing outwardly therefrom which is adapted to abut and sealingly engage a pathway conduit positioned thereadjacent within the pathway conduit zone. The partitioning device itself is preferably U-shaped and includes an abutment panel extending between one of the first mounting slots defined in the first support member and one of the second mounting slots defined in the second support member in order to facilitate abutment of the pathway conduit positioned within the pathway conduit zone located thereadjacent. The abutment panel defines the sealing surface facing outwardly therefrom to abut and sealingly engage a pathway conduit positioned thereadjacent within the pathway conduit zone.

The partitioning device further includes a first engagement tab extending generally perpendicularly away from the abutment panel in a direction opposite from said sealing surface and generally parallel with respect to the first support member thereacross to facilitate engagement therebetween to retain the abutment panel adjacent the pathway conduit zone. Similarly a second engagement tab is included extending generally perpendicularly away from the abutment panel in a direction opposite from the sealing surface and generally parallel with respect to the second support member thereacross to facilitate engagement therebetween to retain the abutment panel adjacent the pathway conduit zone. The second engagement tab is preferably spatially disposed from the first engagement tab to facilitate positioning thereof adjacent to the second support member.

The partitioning member can include set screws positioned in the abutment panel thereof and extendable outwardly toward the pathway conduit positioned within the pathway conduit zone thereadjacent to facilitate sealing engagement therewith and to firmly hold the pathway conduit firmly in place with respect to the surrounding wall panel.

A first securement device such as a screw or the like is adapted to secure the first engagement tab of the partitioning member with respect to the first support member. Similarly a second securement means such as a screw device is adapted to secure the second engagement tab of the partitioning device with respect to the second support member for holding the partitioning member in the pre-chosen place after installation.

Preferably the apparatus will include the capability of mounting the U-shaped vertically extending partitioning member at a plurality of locations to accommodate the use any number of pathways less than the maximum capacity of the unit. Also various configurations need to be capable of being utilized and for this purpose the partitioning device needs to be capable of facing in a sealingly engaging manner toward either the first end means or the second end means at any of the mounting positions thereof.

It is an object of the apparatus of the present invention to provide a system which is usable for mounting multiple pathway conduits through a wall up to the maximum capacity of the unit while at the same time providing a securely mounted unit when less than the maximum number of pathway conduits are utilized.

It is an object of the apparatus of the present invention to provide a system which allows for any configuration of pathway conduits in a number less than the total capacity of the mounting system.

It is an object of the apparatus of the present invention to provide a system which provides a means for firmly securing pathway conduits with respect to a surrounding wall area.

It is an object of the apparatus of the present invention to provide a system which allows two or three sleeves to be positioned with respect to a mounting plate that can accommodate three, four, five or even a greater number thereof.

It is an object of the apparatus of the present invention to provide a system which allows for free fixed positioning of pathway conduits at any location within the grid of a multiple unit mounting system.

It is an object of the apparatus of the present invention to provide a system which allows the use of less than the full capacity of a pathway conduit wall mounting system.

It is an object of the apparatus of the present invention to provide a system which minimizes openings or critical gaps adjacent to pathway conduits extending through such wall panels.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 5:
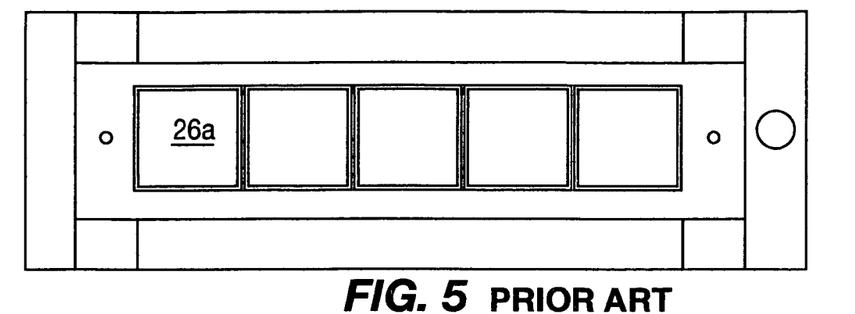
FIG. 5 is a schematic illustration of the prior art shown utilized to full capacity with five pathway conduits positioned within a pathway conduit zone having a capacity of five.
Figure 6:
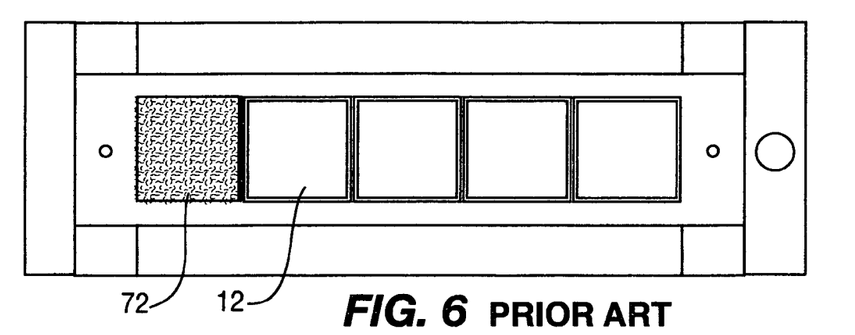
FIG. 6 is an illustration of the prior art shown in FIG. 5 wherein four pathway conduits are positioned within a mounting bracket apparatus having a capacity of five which results in an unsealed slot.
Figure 7:
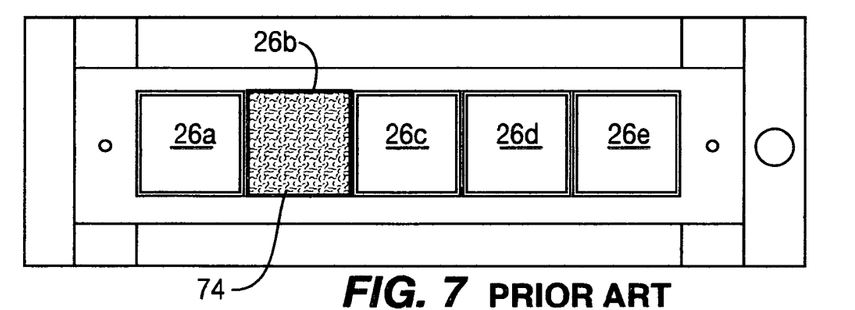
FIG. 7 shows a prior art device with the use of four non-adjacently positioned pathway conduits and the unsealed section of the prior art.
Figure 8:
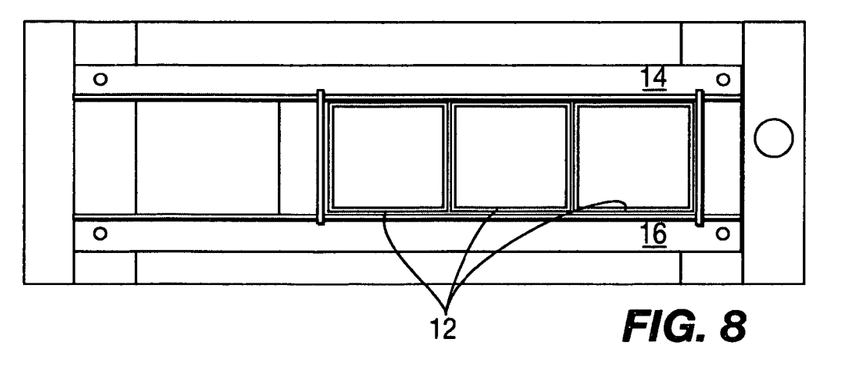
FIG. 8 is a schematic illustration of the apparatus of the present invention showing the vertically extending partitioning member moved to a mounting location such that firm securement with respect to the wall is achievable with a mounting apparatus having a capacity of five pathway conduits in an application where only three such pathway conduits are being utilized.

The present invention provides a unique configuration which facilitates secure mounting of a plurality of pathway conduits 12 within a wall panel 10 where the full capacity of the mounting apparatus is not completely used. Normally multiple pathway conduits 12 extend through a wall to facilitate communication between rooms for various types of lines such as computer lines or electrical lines. A mounting frame is normally provided which extends through a wall panel 10 between adjacently positioned studs 11. Normally such studs are spaced apart from one another at various predetermined distances of approximately one to one and a half feet. The frame is attached on each opposite end with respect to the studs and defines therebetween a predetermined number of mounting positions for pathway conduits 12 extending therethrough. As shown in the prior art in FIGS. 5, 6 and 7, normally the number of mounting locations is five, however, any number of pre-defined locations can be utilized. The difficulty arises when less than the full capacity of pathway conduits 12 is utilized such as shown in FIGS. 6 and 7. FIG. 6 shows the unsealed slots 72 immediately to the left of the leftmost pathway conduit 12 which results from a lack of adjustability in the mounting frame. In a similar manner FIG. 7 shows four pathway conduits 12 mounted in a non-adjacent manner which can define therebetween an unsealed section 74 which is also very undesirable. The unsealed slot 72 and the unsealed section 74 are defined as failures when because sealing is a very important characteristic of mounting of pathway conduits 12 within wall panels 10. As such, in the prior art the capability of mounting a number of pathway conduits 12 less than the total capacity of the wall mounting fixture is a problem. The present invention provides a means for sealing around and firmly securing a number of pathway conduits less than the total capacity of the wall mounting frame. This apparatus includes, as shown in FIGS. 1-4 and schematically in FIG. 8, a first support member 14 extending usually horizontally and having a generally L-shaped configuration preferably. A second support member 16 similarly configured and mounted as a mirror image thereof is positioned below the first support member 14 spaced apart by a distance determined by the first end member 18 and the second end member 20. First end member 18 extends between the first support member 14 and the second support member 16 adjacent one end thereof and the second end member 20 is positioned between members 14 and 16 adjacent the opposite end thereof. In this manner an overall frame is provided by the first and second support members 14 and 16 and the first and second end members 18 and 20. It should be appreciated that this overall frame can be provided as a four piece unit or a two piece unit or as a single integral unit or any number of pieces and still come within the purview of the contemplation of the present invention.

The first support member 14 and the second support member 16 will define therebetween the pathway conduit zone 13 which is adapted to receive a number of pathway conduits 12 extending therethrough. Similarly the first end member 18 and the second end member 20 will define therebetween the lateral dimension of the pathway zone 14.

Figure 1:
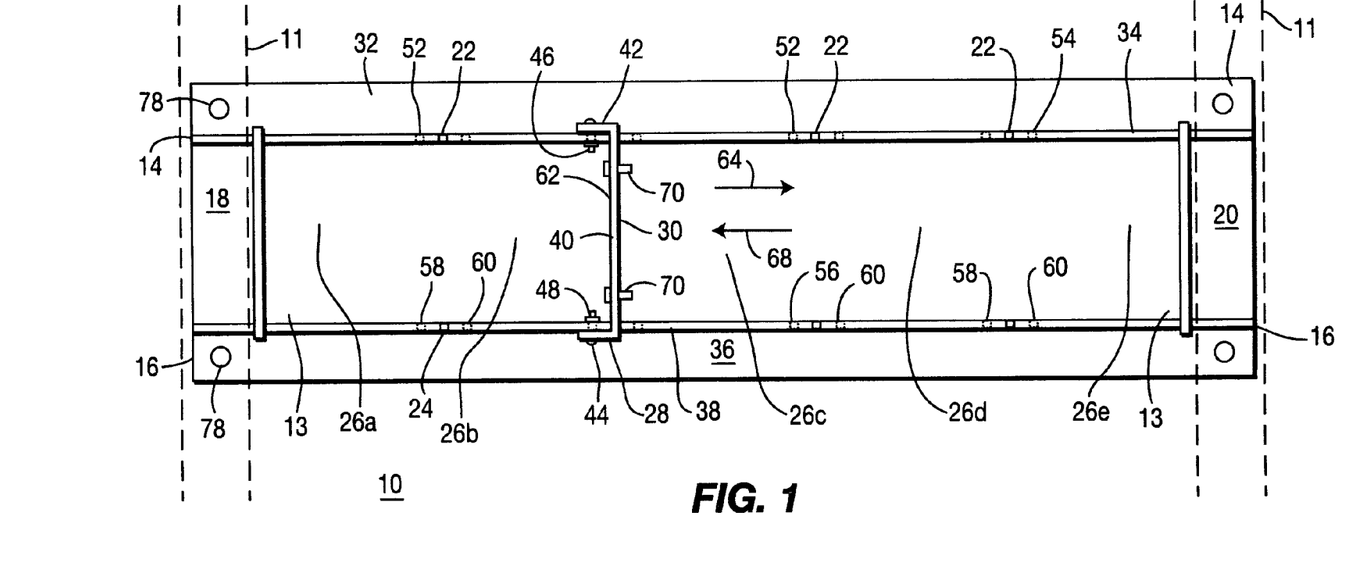
FIG. 1 is a front plan view of an embodiment of the apparatus of the present invention.

FIG. 1 shows an illustration of an embodiment of the present invention wherein a partitioning means 28 has been positioned in mounting slots to provide the apparatus of the present invention to be usable with three pathway conduits 12 in a secure manner with respect to a wall panel 10 even though the overall capacity of the device is five units. This is made possible by the unique adjustable configuration provided for the mounting position of the partitioning member 28 relative to the first and second support members 14 and 16. This configuration is provided by defining the first support member 14 with a plurality of individual first mounting slots 22 defined therein. Preferably these mounting slots will be equally spaced along the horizontal dimension of the pathway conduit zone 13 but this is not a requirement and the present invention could easily be practiced with the positioning of the mounting slots 22 with respect to one another being in an unequally spaced manner. In the configuration shown in FIGS. 1-4, however, the first mounting slots 22 are equally spaced with respect to one another.

Figure 2:
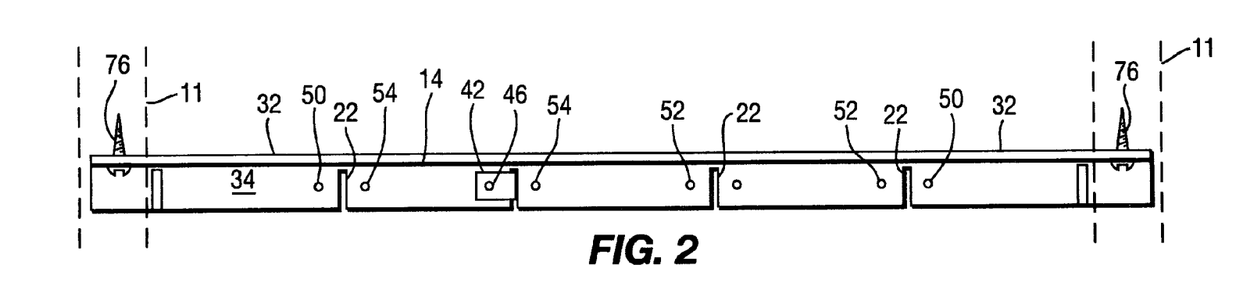
FIG. 2 is a top plan view of the embodiment shown in FIG. 1.

The second support member 16 will define a plurality of second mounting slots 24 which preferably are also equally spaced from one another. In this preferred configuration one second mounting slot 24 is preferably vertically oriented with respect to each first mounting slot 22 thereabove to define therebetween a transverse mounting position 26. As shown in FIGS. 1 and 2, the five transverse mounting positions are defined as mounting positions 26a, 26b, 26c, 26d and 26e. Position 26a is the mounting location at the extreme left of FIGS. 1-4 whereas transverse mounting position 26e is the rightmost location when viewing these drawings.

It is important that the unsealed slots 72 shown in FIG. 6 be avoided and this is achieved by the positioning of the partitioning device 28 in the vertically extending position with the sealing surface 30 thereof immediately adjacent to the outer surface of a pathway conduit 12 positioned thereadjacent. The mounting of the partitioning device 28 in position immediately adjacent to the transverse mounting position 26c is achieved by careful positioning of the first and second mounting slots 22 and 24 in the first and second support members 16 and 18. As seen best in FIG. 2, the individual first mounting slots 22 will be open and will be adapted to receive the vertical partition 28 therewithin.

The first support member 14 preferably includes two discrete members in the overall L-shaped configuration. The first mounting panel 32 thereof is adapted to facilitate securement thereof with respect to a wall structure such as by the use of wall mounting screws 76. These wall mounting screws 76 preferably extend through wall mounting apertures 78 defined in the first mounting panel 32 of the first support member 14 to facilitate fixed securement of the first support member 14 with respect to the wall panel 10.

The first support panel 14 will also include a first partition attachment panel 34 extending outwardly away from the mounting panel 32 and approximately horizontally therewith to define the overall L-shape configuration. This first partition attachment panel 34 will provide a means for mounting of the vertically extending partition 28 with respect to the first support member 14.

The second end member 20 will also include a second mounting panel 36 which preferably defines wall mounting apertures 78 therewithin which facilitates the use of wall mounting screws 76 for securing of the second support member 16 with respect to the wall panel 10. In a similar manner a second partition attachment panel 38 will extend away from the second mounting panel 38 and provide the overall L-shaped configuration for the second support member 16.

The preferred configuration for the partitioning means 28 is of the generally U-shaped configuration. This U-shaped design includes an abutment panel 40 which is the main vertically extending panel which includes the sealing surface 30 on one side thereof adapted to engage an seal against an adjacently positioned pathway conduit 12. The U-shaped configuration for the partitioning device 28 is provided by a first engagement tab 42 which extends generally perpendicularly with respect to the abutment panel in a direction away from the sealing surface 30 at a position adjacent to the first support member 14. In a similar manner a second engagement tab 44 is provided extending approximately perpendicularly away from the abutment panel 40 of vertical partitioning member 28 in such a manner as to extend along and be engageable with respect to the second support member 16. In the preferred configuration of the present invention the U-shaped partitioning member will be securable with respect to the first and second support members 14 and 16 by positioning of the abutment panel 40 thereof extending through a pair of first and second mounting slots 22 and 24 positioned normally directly above and below one another. The first tab 42 will extend to the left as shown in FIG. 1 along the outer surface of the first partition attachment panel 34 of first support member 14. In a similar manner the second engagement tab 44 will extend to the left as shown in FIG. 1 to a position to facilitate engagement thereof with respect to the second support member 16.

Preferably the first engagement tab 42 is secured with respect to the first partition attachment panel 34 of first support member 14 by a first securement means such as first screw means 46. Preferably the first support member 14 will define a first mounting aperture 50 therein to facilitate securement therewith. In a similar manner the second engagement tab 44 will be engageable with respect to the second partition attachment panel 38 of the second support member 16 by a second securement means such as second screw means 48. It should be appreciated that with this configuration the vertically extending partitioning device 28 can be re-positioned in any of the pair of slots positioned immediately above and below one another, that is, the individual pairs of first mounting slots and second mounting slots 22 and 24, to allow the use of the apparatus of the present invention with any number of different pathway conduits 12 extending therethrough in any chosen configuration. It is possible by positioning the partitioning device 28 in the rightmost pair of vertically oriented first and second mounting slots 22 and 24 to allow this wall mounting apparatus which has a total capacity for five individual pathway conduits 12 to be utilized with only a single pathway conduit. In such a use the pathway conduit would be sealed from above and below by the first and second support members 14 and 16 and would be sealed on the right by the second end member 20 and would be sealed on the left by the partitioning means 28.

Figure 3:
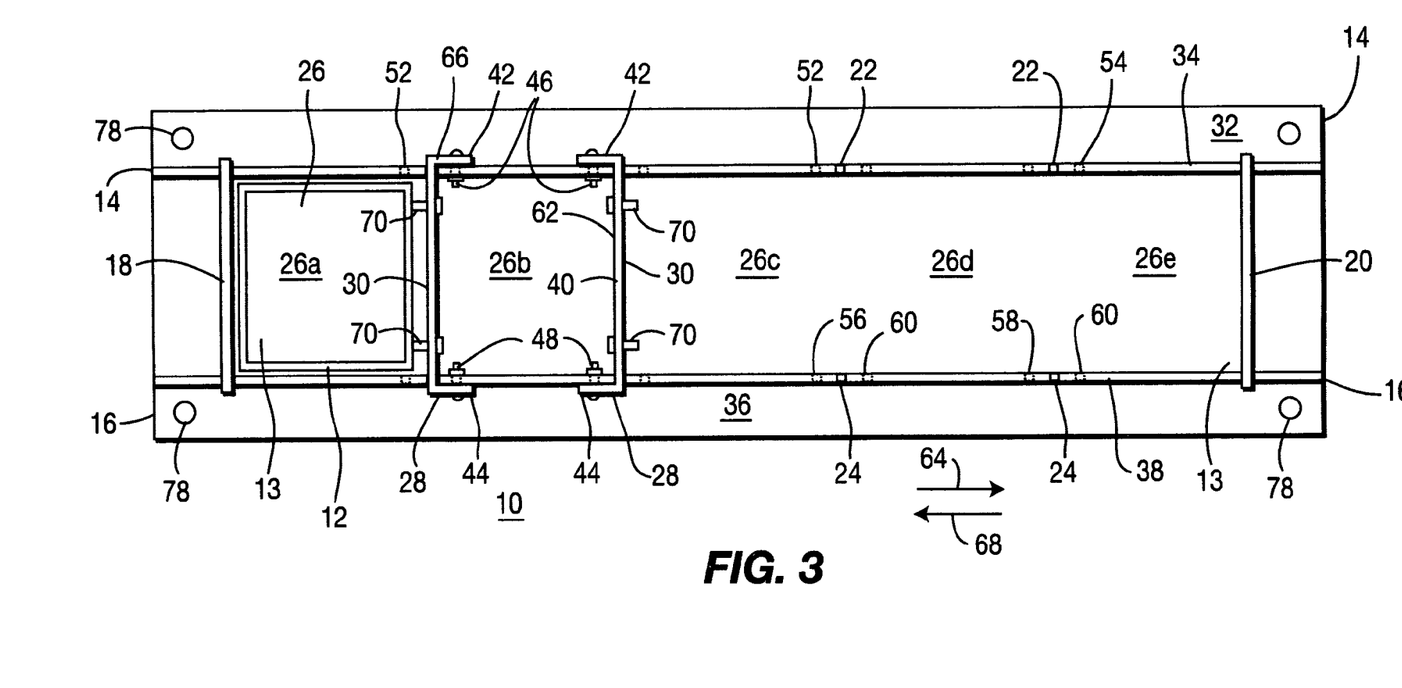
FIG. 3 is a front plan view of an alternative embodiment of the present invention showing vertically extending partition members extending to the left and to the right.
Figure 4:
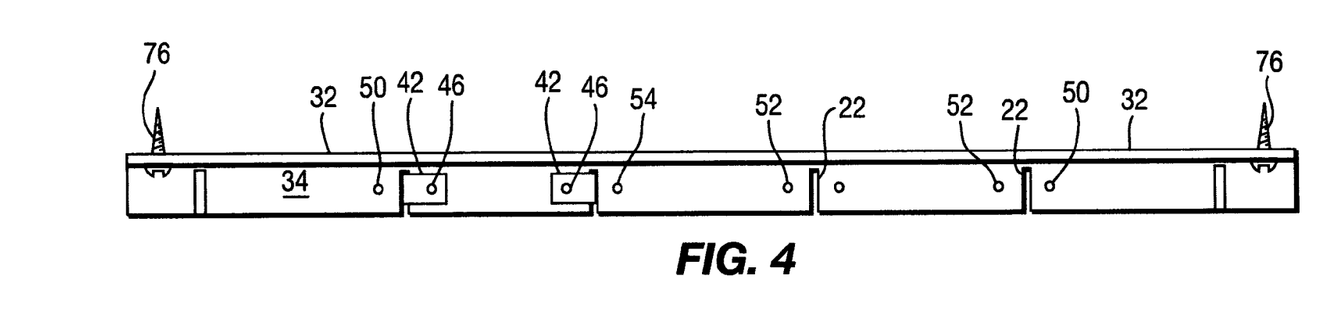
FIG. 4 is a top plan view of the embodiment shown in FIG. 3.

In some circumstances it may be necessary based upon the particular application or design configuration to utilize the apparatus of the present invention to mount pathway conduits 12 in the leftmost portion of the pathway conduit zone 13 as shown best in FIG. 3. FIG. 1 shows the partitioning means 28 positioned in a primary position 62 facing in the primary direction 64. On the other hand FIG. 3 shows the partitioning means 28 of the present invention also in a position as shown in the left portion of the drawing facing in the secondary direction 68 in a secondary position 66.

In order to achieve the capability of orienting the vertically extending partitioning member 28 facing both the primary direction and the second direction, it is preferable to include mounting apertures on both sides of each slot in each of the first and second support members 14 and 16. For this purpose as shown best in FIGS. 1-4, the first mounting aperture 50 can include a primary first mounting aperture 52 and a secondary first mounting aperture 54 positioned on each opposite side of the slot to provide a more universal capability. In a similar manner each of the second mounting apertures 56 can include both a primary second mounting aperture 58 and a secondary second mounting aperture 60. Thus, when it is desired to have the partition device 28 face the primary direction 64, the first securement means 46 thereof will be secured with respect to a pair of vertically aligned primary first mounting apertures 52 and primary second mounting apertures 58. On the other hand, when it is desired that the partitioning device 28 face to the left as shown in the leftmost portion of FIG. 3, the first and second securement means 46 and 48 thereof will be mounted with respect to the secondary first mounting aperture 54 and a vertically aligned secondary second mounting aperture 60.

With this configuration the overall adjustability of a mounting apparatus and use thereof with less than the total capacity thereof is significantly enhanced. This construction not only provides a means for mounting such members securely but also maintains the integrity of the surrounding wall panel 10 by providing a firm and secure means of attachment.

To facilitate sealing engagement of the sealing surface 30 of the partitioning member 28 set screws 70 can be included which extend therethrough and are adapted to abut and engage a pathway conduit 12 positioned in the pathway conduit zone 13 immediately thereadjacent as shown best in FIG. 3.

It should be appreciated that the securement screws 46 and 48 which attach the engagement tabs of the present invention with respect to the support members 14 and 16 can be sheet metal screws used with nuts as shown in FIG. 1 or can be self-tapping screws as shown in FIG. 3.

It should be appreciated that the most important aspect of the present mounting system is the inclusion of movable partitions mounting in a unique manner due to the fact that most mounting systems for pathway conduits 12 extend from one stud to another and therefore are of a predetermined length and accommodate a predetermined number of units. The present invention provides a means for utilizing of such a device with less than the maximum number of units while maintaining a firm and secure mounting of the conduits 12 extending through the wall 10 while maintaining the integrity of the wall panels 10 immediately there surrounding. This system provide a high degree of flexibility in regard to the use of a particular mounting system in various applications and thereby greatly reduces inventory requirements for storing multiple units each having a specific number of pathway conduits 12 with which it is solely usable.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An apparatus for adjustably retaining and sealing pathway conduits mounted extending through a wall panel comprising:
   A. a first support member securable to a wall adjacent to at least one pathway conduit extending therethrough, said first support member being adapted to abut and sealingly engage a pathway conduit positioned thereadjacent, said first support member defining a plurality of first mounting slots therewithin;
   B. a second support member securable to a wall spatially disposed from said first support member to define therebetween a pathway conduit zone for receiving, retaining and sealing adjacent pathway conduits extending therethrough, said second support member being adapted to abut and sealingly engage a pathway conduit positioned thereadjacent within said pathway conduit zone, said second support member defining a plurality of second mounting slots therewithin, each of said second mounting slots being aligned with one of said first mounting slots to define at least transverse mounting position therealong;

C. a first end member extending between said first support member and said second support member and adapted to abut and sealingly engage a pathway conduit positioned thereadjacent;

D. a second end member extending between said first support member and said second support member at a position spatially disposed from said first end member to define said pathway conduit zone therebetween, said second end member being adapted to abut and sealingly engage a pathway conduit positioned thereadjacent within said pathway conduit zone; and E. a partitioning means being detachably attachable with respect to said first mounting slots of said first support member and said second mounting slots of said second support member at one of said transverse mounting positions positioned therealong while extending therebetween, said partitioning means defining a sealing surface facing outwardly therefrom adapted to abut and sealingly engage a pathway conduit positioned thereadjacent within said pathway conduit zone, said partitioning means being generally U-shaped and including:

(1) a abutment panel extending between one of said first mounting slots defined in said first support member and one of said second mounting slots defined in said second support member for facilitating abutment with a pathway conduit positioned within said pathway conduit zone thereadjacent, said abutment panel defining said sealing surface facing outwardly therefrom to abut and sealingly engage a pathway conduit positioned thereadjacent within said pathway conduit zone;

(2) a first engagement tab extending generally perpendicularly away from said abutment panel in a direction opposite from said sealing surface and generally parallel with respect to said first support member thereacross to facilitate engagement therebetween to retain said abutment panel adjacent said pathway conduit zone; and (3) a second engagement tab spatially disposed from said first engagement tab and extending generally perpendicularly away from said abutment panel in a direction opposite from said sealing surface and generally parallel with respect to said second support member thereacross to facilitate engagement therebetween to retain said abutment panel adjacent said pathway conduit zone.

2. An apparatus for adjustably retaining and sealing pathway conduits mounted extending through a wall panel as defined in claim 1 wherein said first support member includes a first mounting panel positionable adjacent the wall panel for mounting thereto and a first partition attachment panel being detachable securable with respect to a partitioning means, and wherein said second support member includes a second mounting panel positionable adjacent the wall panel for mounting thereto and a second partition attachment panel being detachable securable with respect to a partitioning means.

3. An apparatus for adjustably retaining and sealing pathway conduits mounted extending through a wall panel as defined in claim 2 wherein said first mounting panel and said second mounting panel extend across wall panel generally parallel thereto and wherein said first partition attachment panel extends approximately perpendicularly with respect to said first mounting panel and outwardly therefrom and wherein said second partition attachment panel extends approximately perpendicularly with respect to said second mounting panel and outwardly therefrom.

4. An apparatus for adjustably retaining and sealing pathway conduits mounted extending through a wall panel as defined in claim 3 wherein said first mounting panel and said second mounting panel are L-shaped in cross-section.

5. An apparatus for adjustably retaining and sealing pathway conduits mounted extending through a wall panel as defined in claim 2 wherein said first mounting slots are defined in said first partition attachment panel and wherein said second slots are defined in said second partition panel.

6. An apparatus for adjustably retaining and sealing pathway conduits mounted extending through a wall panel as defined in claim 5 wherein said first mounting slots and said second mounting slots extend perpendicularly with respect to said first mounting panel and said second mounting panel, respectively.

7. An apparatus for adjustably retaining and sealing pathway conduits mounted extending through a wall panel as defined in claim 1 further comprising a first securement means adapted to secure said first engagement tab of said partitioning means with respect to said first support member and further comprising a second securement means adapted to secure said second engagement tab of said partitioning means with respect to said second support member.

8. An apparatus for adjustably retaining and sealing pathway conduits mounted extending through a wall panel as defined in claim 7 wherein said first securement means includes a first screw means to facilitate securement of said first engagement tab to said first support member and wherein said second securement means includes a second screw means to facilitate securement of said second engagement tab to said second support member.

9. An apparatus for adjustably retaining and sealing pathway conduits mounted extending through a wall panel as defined in claim 8 wherein said first support member defines a first mounting aperture extending therethrough to facilitate operative engagement of said first engagement tab with respect to said first support member and wherein said second support member defines a second mounting aperture extending therethrough to facilitate operative engagement of said second engagement tab with respect to said second support member.

10. An apparatus for adjustably retaining and sealing pathway conduits mounted extending through a wall panel as defined in claim 9 wherein said first mounting aperture includes a primary first mounting aperture and a secondary first mounting aperture positioned laterally adjacent to each of said first mounting slots, said primary first mounting aperture and said secondary first mounting aperture being positioned on laterally opposite sides of said first mounting slots to facilitate operative securement of said first securement means between said first engagement tab and said first support member and wherein said second mounting aperture includes a primary second mounting aperture and a secondary second mounting aperture positioned laterally adjacent to each of said second mounting slots, said primary second mounting aperture and said secondary second mounting aperture being positioned on laterally opposite sides of said second mounting slots to facilitate operative securement of said second securement means between said second engagement tab and said second support member.

11. An apparatus for adjustably retaining and sealing pathway conduits mounted extending through a wall panel as defined in claim 10 wherein said partitioning means is positionable within any one of said mounting slots in a primary position with said sealing surface thereof facing in a primary direction in abutment with and in sealing engagement with a pathway conduit positioned within the pathway conduit zone thereadjacent and in a secondary position with said sealing surface thereof facing in a secondary direction in abutment with and in sealing engagement with a pathway conduit positioned within the pathway conduit zone thereadjacent, said secondary direction being oriented oppositely along said pathway conduit zone from said primary direction.

12. An apparatus for adjustably retaining and sealing pathway conduits mounted extending through a wall panel as defined in claim 11 wherein said partitioning means is in engagement with said primary first mounting aperture and said primary second mounting aperture responsive to being in the primary position facing the primary direction and is in engagement with said secondary first mounting aperture and said secondary second mounting aperture responsive to being in the secondary position facing the secondary direction.

13. An apparatus for adjustably retaining and sealing pathway conduits mounted extending through a wall panel as defined in claim 1 wherein said first support member and said second support member are oriented extending generally horizontally and wherein said partitioning means extends generally vertically.

14. An apparatus for adjustably retaining and sealing pathway conduits mounted extending through a wall panel as defined in claim 1 wherein said first mounting slots are equally spaced on said first support member between said first end member and said second end member to facilitate dividing of said pathway conduit zone into a plurality transverse mounting locations for pathway conduits and wherein said second mounting slots are equally spaced on said second support member between said first end member and said second end member to facilitate dividing of said pathway conduit zone into a plurality transverse mounting locations for pathway conduits.

15. An apparatus for adjustably retaining and sealing pathway conduits mounted extending through a wall panel as defined in claim 1 wherein said first support member, said first end member, said second support member and said second end member are formed as a single integral piece.

16. An apparatus for adjustably retaining and sealing pathway conduits mounted extending through a wall panel as defined in claim 1 wherein said first mounting slots of said first support member includes four mounting slots defined equally spaced therealong and wherein said second mounting slots of said second support member includes four mounting slots defined equally spaced therealong to provide four individual transverse mounting positions for said partitioning means in order to selectively define five specific mounting locations for pathway conduits within said pathway conduit zone.

17. An apparatus for adjustably retaining and sealing pathway conduits mounted extending through a wall panel as defined in claim 1 wherein said partitioning means includes a set screw means extendable outwardly therefrom toward a pathway conduit positioned within said pathway conduit zone thereadjacent to facilitate sealing engagement therewith.

18. An apparatus for adjustably retaining and sealing pathway conduits mounted extending through a wall panel comprising:

a first support member securable to a wall adjacent to at least one pathway conduit extending therethrough and being generally L-shaped in cross-section, said first support member being adapted to abut and sealingly engage a pathway conduit positioned thereadjacent, said first support member defining a plurality of first mounting slots therewithin, said first support member including a first mounting panel positionable adjacent the wall panel for mounting thereto and a first partition attachment panel being detachable securable with respect thereto, said first mounting panel extending across the wall panel and being generally parallel thereto, said first partition attachment panel extending approximately perpendicularly with respect to said first mounting panel and outwardly therefrom, said first mounting slots being defined in said first partition attachment panel, said first mounting slots extending perpendicularly with respect to said first mounting panel;

a second support member being generally L-shaped in cross-section and being securable to a wall spatially disposed from said first support member to define therebetween a pathway conduit zone for receiving, retaining and sealing adjacent pathway conduits extending therethrough, said second support member being adapted to abut and sealingly engage a pathway conduit positioned thereadjacent within said pathway conduit zone, said second support member defining a plurality of second mounting slots therewithin, each of said second mounting slots being aligned with one of said first mounting slots to define at least one transverse mounting position therealong, said second support member including a second mounting panel positionable adjacent the wall panel for mounting thereto and a second partition attachment panel being detachable securable with respect to, said second mounting panel extending across the wall panel and being generally parallel thereto, said second partition attachment panel extending approximately perpendicularly with respect to said second mounting panel and outwardly therefrom, said second mounting slots being defined in said second partition attachment panel, said second mounting slots extending perpendicularly with respect to said second mounting panel;

a first end member extending between said first support member and said second support member and adapted to abut and sealingly engage a pathway conduit positioned thereadjacent;

a second end member extending between said first support member and said second support member at a position spatially disposed from said first end member to define said pathway conduit zone therebetween, said second end member being adapted to abut and sealingly engage a pathway conduit positioned thereadjacent within said pathway conduit zone;

a partitioning means being detachably attachable with respect to said first mounting slots of said first support member and said second mounting slots of said second support member at one of said transverse mounting positions positioned therealong while extending therebetween, said partitioning means defining a sealing surface facing outwardly therefrom adapted to abut and sealingly engage a pathway conduit positioned thereadjacent within said pathway conduit zone, said partitioning means being generally U-shaped and including:

(1) an abutment panel extending between one of said first mounting slots defined in said first support member and one of said second mounting slots defined in said second support member for facilitating abutment with a pathway conduit positioned within said pathway conduit zone thereadjacent, said abutment panel defining said sealing surface facing outwardly therefrom to abut and sealingly engage a pathway conduit positioned thereadjacent within said pathway conduit zone;

(2) a first engagement tab extending generally perpendicularly away from said abutment panel in a direction opposite from said sealing surface and generally parallel with respect to said first support member thereacross to facilitate engagement therebetween to retain said abutment panel adjacent said pathway conduit zone;

(3) a second engagement tab spatially disposed from said first engagement tab and extending generally perpendicularly away from said abutment panel in a direction opposite from said sealing surface and generally parallel with respect to said second support member thereacross to facilitate engagement therebetween to retain said abutment panel adjacent said pathway conduit zone;

(4) a set screw means positioned in said abutment panel of said partitioning means and extendable outwardly from toward a pathway conduit positioned within said pathway conduit zone thereadjacent to facilitate sealing engagement therewith;

a first securement means adapted to secure said first engagement tab of said partitioning means with respect to said first support member; and a second securement means adapted to secure said second engagement tab of said partitioning means with respect to said second support member.

19. An apparatus for adjustably retaining and sealing pathway conduits mounted extending through a wall panel comprising:

a first support member extending generally horizontally and being securable to a wall adjacent to at least one pathway conduit extending therethrough and being generally L-shaped in cross-section, said first support member being adapted to abut and sealingly engage a pathway conduit positioned thereadjacent, said first support member defining a plurality of first mounting slots therewithin which are equally spaced therealong, said first support member including a first mounting panel positionable adjacent the wall panel for mounting thereto and a first partition attachment panel being detachable securable with respect thereto, said first mounting panel extending across the wall panel and being generally parallel thereto, said first partition attachment panel extending approximately perpendicularly with respect to said first mounting panel and outwardly therefrom, said first mounting slots being defined in said first partition attachment panel, said first mounting slots extending perpendicularly with respect to said first mounting panel, said first support member defining a first mounting aperture extending therethrough to facilitate operative engagement therewith, said first mounting aperture including a primary first mounting aperture and a secondary first mounting aperture positioned laterally adjacent to each of said first mounting slots, said primary first mounting aperture and said secondary first mounting aperture being positioned on laterally opposite sides of said first mounting slot;

a second support member extending generally horizontally and being generally L-shaped in cross-section and being securable to a wall spatially disposed from said first support member to define therebetween a pathway conduit zone for receiving, retaining and sealing adjacent pathway conduits extending therethrough, said second support member being adapted to abut and sealingly engage a pathway conduit positioned thereadjacent within said pathway conduit zone, said second support member defining a plurality of second mounting slots therewithin which are equally spaced therealong, each of said second mounting slots being aligned with one of said first mounting slots to define at least transverse mounting position therealong, said second support member including a second mounting panel positionable adjacent the wall panel for mounting thereto and a second partition attachment panel being detachable securable with respect to, said second mounting panel extending across the wall panel and being generally parallel thereto, said second partition attachment panel extending approximately perpendicularly with respect to said second mounting panel and outwardly therefrom, said second mounting slots being defined in said second partition attachment panel, said second mounting slots extending perpendicularly with respect to said second mounting panel, said second support member defining a second mounting aperture extending therethrough to facilitate operative engagement therewith, said second mounting aperture including a primary second mounting aperture and a secondary second mounting aperture positioned laterally adjacent to each of said second mounting slots, said primary second mounting aperture and said secondary second mounting aperture being positioned on laterally opposite sides of said second mounting slot;

a first end member extending between said first support member and said second support member and adapted to abut and sealingly engage a pathway conduit positioned thereadjacent;

a second end member extending between said first support member and said second support member at a position spatially disposed from said first end member to define said pathway conduit zone therebetween, said second end member being adapted to abut and sealingly engage a pathway conduit positioned thereadjacent within said pathway conduit zone;

a partitioning means extending generally vertically and being detachably attachable with respect to said first mounting slots of said first support member and said second mounting slots of said second support member at one of said transverse mounting positions positioned therealong while extending therebetween, said partitioning means defining a sealing surface facing outwardly therefrom adapted to abut and sealingly engage a pathway conduit positioned thereadjacent within said pathway conduit zone, said partitioning means being positionable within any one of said mounting slots in a primary position with said sealing surface thereof facing in a primary direction in abutment with and in sealing engagement with a pathway conduit positioned within the pathway conduit zone thereadjacent and in a secondary position with said sealing surface thereof facing in a secondary direction in abutment with and in sealing engagement with a pathway conduit positioned within the pathway conduit zone thereadjacent, said secondary direction being oriented oppositely along said pathway conduit zone from said primary direction, said partitioning means being in engagement with said primary first mounting aperture and said primary second mounting aperture responsive to being in the primary position facing the primary direction and being in engagement with said secondary first mounting aperture and said secondary second mounting aperture responsive to being in the secondary position facing the secondary direction, said partitioning means being generally U-shaped and including:
(1) an abutment panel extending between one of said first mounting slots defined in said first support member and one of said second mounting slots defined in said second support member for facilitating abutment with a pathway conduit positioned within said pathway conduit zone thereadjacent, said abutment panel defining said sealing surface facing outwardly therefrom to abut and sealingly engage a pathway conduit positioned thereadjacent within said pathway conduit zone;
(2) a first engagement tab extending generally perpendicularly away from said abutment panel in a direction opposite from said sealing surface and generally parallel with respect to said first support member thereacross to facilitate engagement therebetween to retain said abutment panel adjacent said pathway conduit zone, said first engagement tab being engageable with respect to said first mounting aperture;
(3) a second engagement tab spatially disposed from said first engagement tab and extending generally perpendicularly away from said abutment panel in a direction opposite from said sealing surface and generally parallel with respect to said second support member thereacross to facilitate engagement therebetween to retain said abutment panel adjacent said pathway conduit zone said second engagement tab being engageable with respect to said second mounting aperture;
(4) a set screw means positioned in said abutment panel of said partitioning means and extendable outwardly from toward a pathway conduit positioned within said pathway conduit zone thereadjacent to facilitate sealing engagement therewith;
a first securement means adapted to secure said first engagement tab of said partitioning means with respect to said first support member, said first securement means including a first screw means to facilitate securement of said first engagement tab to said first support member; and
a second securement means adapted to secure said second engagement tab of said partitioning means with respect to said second support member, said second securement means including a second screw means to facilitate securement of said second engagement tab to said second support member.

* * * * *